United States Patent Office 3,459,216
Patented Aug. 5, 1969

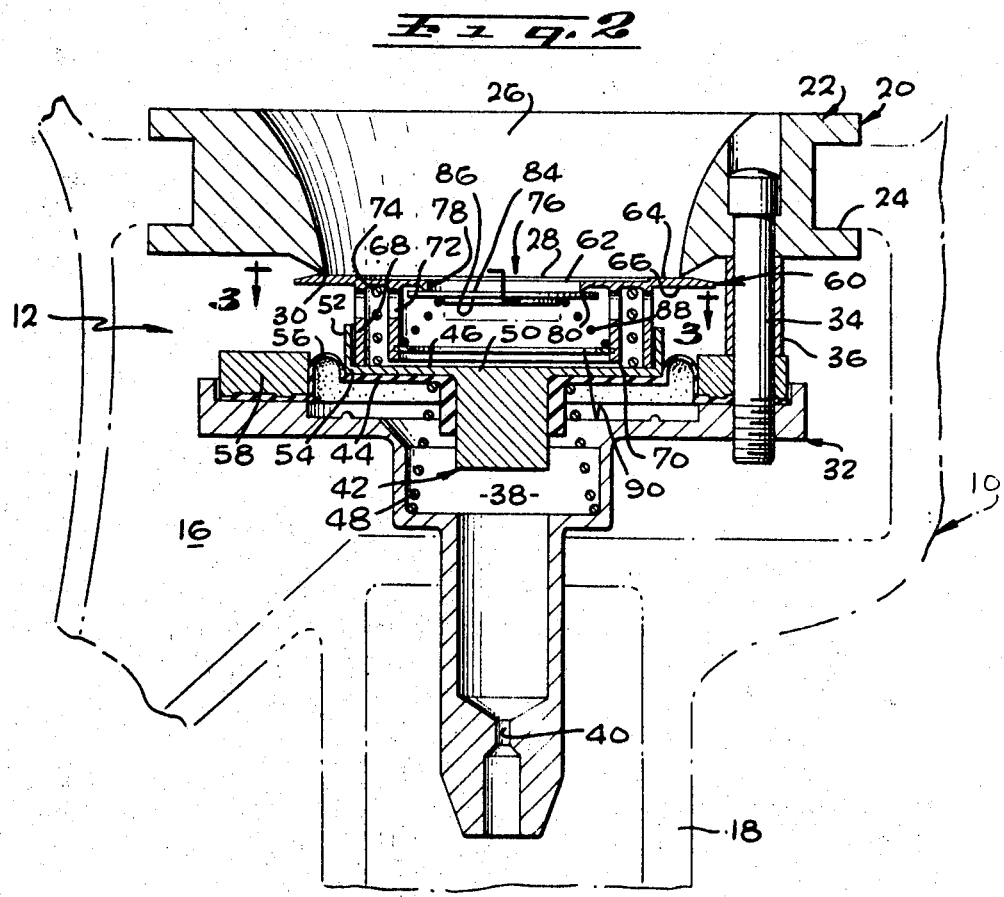
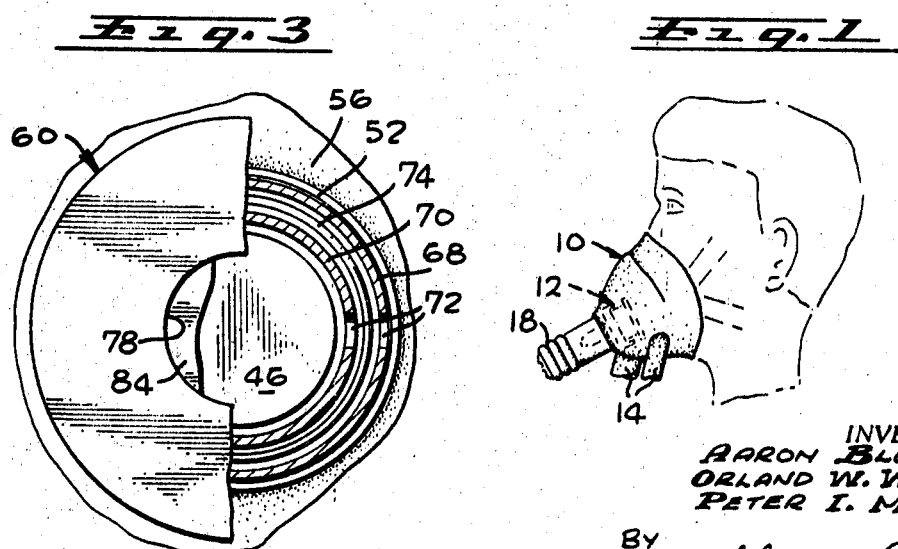

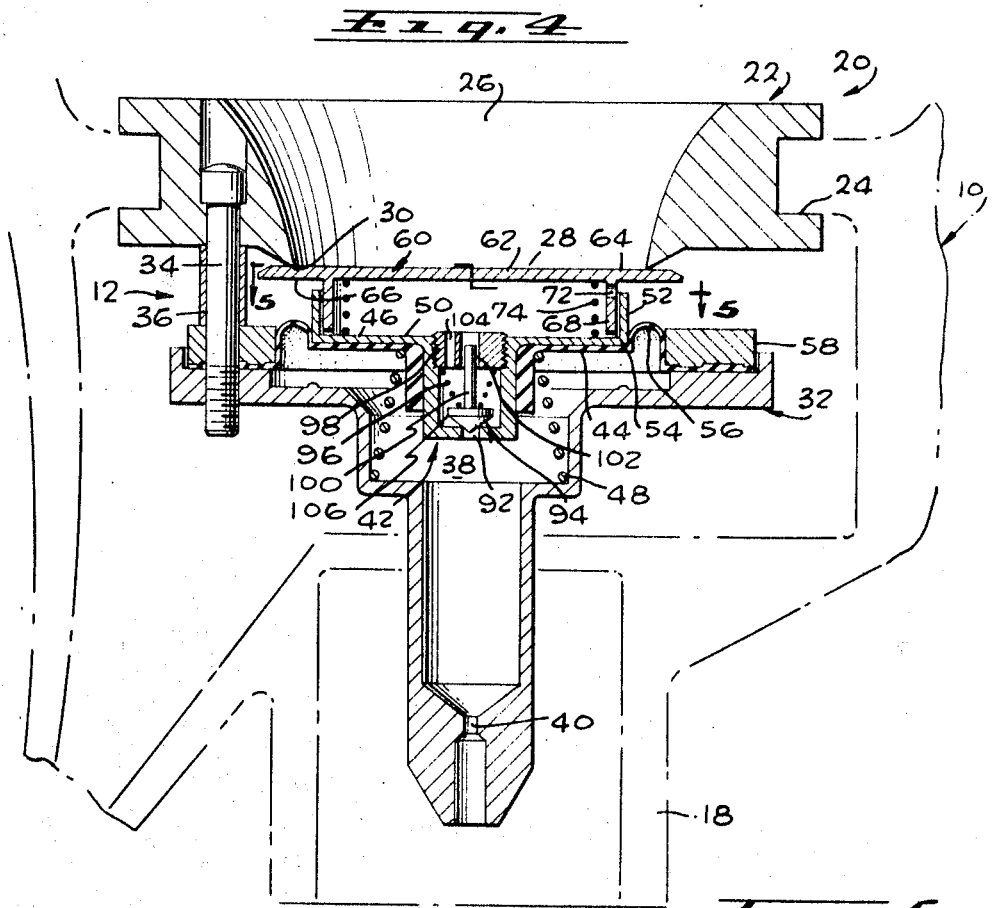

3,459,216
PRESSURE COMPENSATED EXHALATION VALVE
Aaron Bloom, Pasadena, Orland W. Wilcox, Sierra
Madre, and Peter I. Mate, Pasadena, Calif., assignors
to Sierra Engineering Company, Sierra Madre, Calif.,
a corporation of California
Filed June 1, 1967, Ser. No. 642,904
Int. Cl. F16k 15/14; A62b 7/14, 9/02
U.S. Cl. 137—512.1                                   9 Claims

ABSTRACT OF THE DISCLOSURE

A pressure compensated exhalation valve with a safety relief means which permits fluids to exhaust from the breathing mask through the valve without regard to rapid fluctuations in ambient pressure.

---

The invention relates to high altitude breathing equipment and has particular reference to a pressure compensated exhalation valve including safety relief means for use in a pressure helmet or oro-nasal breathing mask by means of which the pilot is enabled to exhale from the breathing equipment without regard to rapid fluctuations in the ambient fluid pressure.

Many types of aircraft operate at altitudes where the atmospheric pressure is extremely low. In general the cockpits of these aircraft are pressurized so that the ambient pressure in the cockpit is considerably above that which prevails outside the aircraft. If the wall of the cockpit is ruptured through accident, mechanical failure or the action of hostile forces as in the case of fighter aircraft the pressure in the cockpit will drop very rapidly to that prevailing outside the aircraft.

Pressure compensated exhalation valves in general have their component parts arranged so that the pressure of the breathing fluid supply is applied to both sides of the exhaust valve. In this manner the ambient pressure does not generally influence the amount of force required to open the exhaust valve. In the event of rapid decompression, however, the ambient pressure in the cockpit drops rapidly causing an expansion of the gases within the lung and mask system. Under these conditions the compensating pressure on the outside of the exhaust valve may exceed that within the mask and lung system thus jamming the exhaust valve shut. This condition of overpressure compensation may continue for a few seconds until the system has had time enough to stabilize itself. During this period of time the expansion of gases may be sufficient to cause extreme discomfort or injury to the pilot or he may be asphyxiated because he is unable to exhale.

These and other disadvantages of the prior art are overcome according to this invention by providing a valve which contains in the body thereof an exhaust port, a compensating pressure chamber, a movable diaphragm, an exhaust port valve which moves with the diaphragm and a safety relief means for exhausting breathing fluid through the exhaust port in the event the system becomes overpressure compensated.

Drawing summary

In the embodiment illustrated in the accompanying drawings:

FIGURE 1 is a side view of a breathing mask in operative position on the face of a wearer.

FIGURE 2 is a cross-sectional view of a pressure compensated exhalation valve wherein the valve plate is provided with a safety vent valve.

FIGURE 3 is a fragmentary partial cross-sectional view taken on line 3—3 in FIGURE 2.

FIGURE 4 is a cross-sectional view of a pressure compensated exhalation valve wherein a relief port is provided in the compensating pressure chamber.

FIGURE 5 is a fragmentary view partially in cross-section taken along line 5—5 in FIGURE 4.

FIGURE 6 is a fragmentary cross-sectional view of a portion of a pressure compensated exhalation valve which contains a relief port in a wall of a pressure compensating pressure chamber.

In the embodiments of the invention chosen for the purpose of illustration a breathing mask 10 of resilient conforming material is provided with a pressure compensating exhalation valve 12, exhaust discharge openings 14 which are open to ambient pressure surrounding the mask and communicate with exhaust chamber 16 shown in phantom lines in FIGURES 2, 4 and 6. Breathing mask 10 is provided with pressure inlet 18 through which breathing fluid is supplied to the mask.

Referring particularly to FIGURES 2 through 6 there is illustrated a valve body indicated generally at 20 which is divided into a first half indicated generally at 22. First half 22 is provided at the outer periphery thereof with a groove 24 which is adapted to cooperate with mask 10 in a fluid tight sealing relationship. Exhaust port 26 is provided with exhaust side 28 and exhaust port valve seat 30. As illustrated exhaust port valve seat 30 is comprised of a knife edge at the outermost edge thereof. The second half indicated generally at 32 of valve body 20 is connected to first half 22 by bolt 34. First half 22 and second half 32 are maintained in the proper spaced relationship by spacer 36.

Compensating pressure chamber 38 is provided in a wall thereof with fluid pressure inlet orifice 40. Fluid pressure inlet orifice 40 has a predetermined cross-sectional area.

A movable diaphragm 42 is mounted within valve body 20. Inner surface 44 of movable diaphragm 42 defines a wall of compensating pressure chamber 38. Outer surface 46 of movable diaphragm 42 is exposed to the ambient pressure prevailing in exhaust chamber 16. Movable diaphragm 42 is biased outwardly from compensating pressure chamber 38 by the action of diaphragm spring 48. Movable diaphragm 42 is comprised of rigid disc 50 and flexible seal 56. Rigid disc 50 is provided on the outer surface 46 with an outwardly projecting annular ring 52. Annular ring 52 is located at about periphery 54 of rigid disc 50. Flexible seal 56 extends between rigid disc 50 and valve body 20. The outer edge of flexible seal 56 is secured and retained in place against valve body 20 by sealing ring 58.

An exhaust port valve indicated generally at 60 is comprised of a rigid valve plate 62, which plate has a seal side 64 and an outer side 66. Outer side 66 is exposed to the ambient pressure prevailing in exhaust chamber 16. Seal side 64 is provided with a surface, preferably of some elastomeric material, which cooperates with exhaust port valve seat 30 to provide a fluid tight seal between valve seat 30 and seal side 64. Referring particularly to FIGURE 2 there is illustrated a first annular rim 68 and a second annular rim 70 projecting outwardly from the outer side 66 of valve plate 62. First annular rim 68 and second annular rim 70 are generally concentric with one another. First annular rim 68 is of somewhat greater diameter than second annular rim 70. Fluid passages 72 are provided in first annular rim 68 and second annular rim 70. An exhaust port valve spring 74 is positioned between outer surface 46 of movable diaphragm 42 and outer side 66 of exhaust port valve 60 in the annular space between first annular rim 68 and second annular rim 70.

Referring particularly to FIGURE 2 a safety vent indicated generally at 76 is provided with an opening 78 which passes through exhaust port valve 60 from seal side 64 to outer side 66. A safety vent valve seat 80 is provided at the outer side of opening 78. Safety vent valve seat 80 as illustrated is a knife edge projecting outwardly from outer side 66 toward vent seal side 84 of safety vent valve 82. The outer side 86 of safety vent valve 82 is in contact with safety vent valve spring 88. Safety vent valve spring 88 is retained in position against outer side 86 by spring retainer 90. Spring retainer 90 is supported in place by second annular rim 70.

First annular rim 68 is slidably engaged with annular ring 52 so that exhaust port valve 60 is supported by and movable with diaphragm 42. The fluid pressure in compensating pressure chamber 38 in combination with the reaction of diaphragm spring 48 tends to bias movable diaphragm 42 outwardly towards exhaust port valve 60. The reaction of exhaust port valve spring 74 tends to urge movable diaphragm 42 and exhaust port valve 60 apart. The reaction of safety vent valve spring 88 tends to bias safety vent valve 82 toward safety vent valve seat 80. Vent seal side 84 cooperates with safety vent valve seat 80 to provide a fluid tight seal therebetween.

Referring particularly to FIGURE 4 movable diaphragm 42 is provided with a relief port 92 which extends through inner surface 44. Relief port 92 has a predetermined cross-sectional area which is greater than the cross-sectional area of fluid pressure inlet orifice 40. A poppet valve indicated generally at 94 is positioned adjacent relief port 92 outside of compensating pressure chamber 38. Poppet valve 94 is held closed against fluid pressure in compensating pressure chamber 38 by poppet valve spring 96. The tension valve spring 96 can be accurately adjusted by means of adjustable spring retainer 98. Poppet valve spring 96 is held in compression between adjustable spring retainer 98 and poppet valve head 106. Adjustable spring retainer 98 is provided with an opening 102 which serves to receive and guide poppet valve stem 100. A passage 104 in adjustable spring retainer 98 opens into the ambient pressure existing in exhaust chamber 16. When the compensating pressure in compensating pressure chamber 38 exceeds the ambient pressure in exhaust chamber 16 by a predetermined amount poppet valve 94 opens for a sufficient period of time to dump any excess compensating pressure into exhaust chamber 16 thus allowing exhaust port valve 60 to open. The predetermined pressure differential at which this dumping action will occur is established by adjusting adjustable spring retainer 98 to obtain the necessary tension in poppet valve spring 96. Providing relief port 92 with a greater cross-sectional area than fluid pressure inlet orifice 40 insures that pressure can be dumped from compensating pressure chamber 38 faster than it can be supplied through inlet orifice 40.

In the embodiment illustrated in FIGURE 6 relief port 92 and poppet valve 94 are located in an outer wall of second half 32 of valve body 20 rather than in movable diaphragm 42.

In the embodiment illustrated in FIGURES 2 and 3 the tension in safety vent valve spring 88 is adjusted to such a predetermined valve that safety vent valve 82 remains closed at all times under normal breathing pressures. When exhaust port valve 60 is forced shut by excess pressure in compensating pressure chamber 38 the person wearing breathing mask 10 can force safety vent valve 82 open by exhaling with slightly more than normal force. As soon as the greater than normal breathing force is withdrawn safety vent valve 82 is immediately closed by the action of vent valve spring 88 and normal operation of the valve is resumed.

During normal operation the increased pressure in exhaust port 28 due to exhalation is sufficient to overcome the tension is springs 48 and 74 so as to open valve 60. Flexible seal 56 permits diaphragm 42 to move freely toward or away from exhaust port 26. Annular ring 52 cooperates with first annular rim 68 to retain valve 60 in operative position adjacent port 26.

In operation the exhalation valve of this invention provides a means for either dumping or overriding the pressure in compensating pressure chamber 38 in the event this pressure becomes so excessive that is prevents the opening of exhaust port valve 60.

As will be understood by those skilled in the art what has been described are preferred embodiments in which changes and modifications may be made without departing from the spirit and scope of the accompanying claims.

What is claimed as new in support of Letters Patent is:

1. A pressure compensated exhalation valve in a pressure compensated breathing fluid supply system which comprises:
   a valve body having;
   an exhaust port;
   a compensating pressure chamber having a pressure inlet orifice in one wall thereof;
   a movable diaphragm the inner surface of which forms one wall of said pressure chamber, the outer surface of said diaphragm being exposed to ambient pressure, said diaphragm normally being biased outwardly from said pressure chamber;
   an exhaust port valve movable with said diaphragm, and positioned adjacent said exhaust port in closing relationship therewith, said exhaust port valve normally being biased toward said exhaust port; and
   safety relief means for exhausting fluid through said exhaust port without regard to fluctuations in the ambient pressure, said safety relief means being openable by fluid pressure when said breathing fluid supply system becomes over pressure compensated.

2. The pressure compensated exhalation valve of claim 1 wherein said movable diaphragm comprises:
   a diaphragm disc having a ring extending outwardly from about the periphery of the outer surface of said disc; and
   a flexible seal extending between said valve body and said disc; and wherein said exhaust port valve comprises:
      a valve plate having a seal side adapted to cooperate with a valve seat at the exit end of said exhaust port and an outer side exposed to ambient pressure, a rim extending outwardly from the outer side of said valve plate, said ring and said rim being adapted to slidably cooperate with one another whereby said exhaust port valve is carried by said diaphragm.

3. The pressure compensated exhalation valve of claim 1 wherein said exhaust port valve comprises:
   a valve plate having a seal side adapted to cooperate with a valve seat at the exit end of said exhaust port and an outer side exposed to ambient pressure;
   a safety vent in said valve plate, said vent being open to ambient pressure;
   a safety vent valve positioned adjacent the outer side of said plate, said vent valve being adapted to close said vent, said vent valve normally being biased to close said vent.

4. The pressure compensated exhalation valve of claim 1 wherein said safety relief means comprises:
   a relief port in said compensating pressure chamber, said relief port being open to ambient pressure;
   a poppet valve positioned adjacent said relief port and adapted to close said relief port, said poppet valve normally being biased to close said relief port.

5. The pressure compensated exhalation valve of claim 4 wherein said relief port is in said valve body.

6. A pressure compensated exhalation valve with safety relief means which comprises:
   a valve body having;
   an exhaust port with an exhaust port valve seat adjacent the exhaust side thereof;

a compensating pressure chamber having a fluid pressure inlet orifice in a wall thereof;

a movable diaphragm the inner surface of which forms a wall of said chamber, the outer surface of said diaphragm being exposed to ambient fluid pressure, said diaphragm being spring biased outwardly from said chamber and being adapted to be pressure biased outwardly from said chamber by compensating fluid pressure in said chamber, said diaphragm comprising a rigid disc having an annular ring extending outwardly from about the periphery of the outer surface of said disc, and a flexible seal extending between said valve body and said disc;

an exhaust port valve positioned adjacent the exhaust side of said exhaust port and in closing relationship therewith, said exhaust port valve comprising a rigid valve plate having a seal side adapted to cooperate in sealing relationship with said valve seat and an outer side exposed to ambient fluid pressure, first and second annular rims extending outwardly from the outer side of said plate, said rims being spaced apart and concentric with one another, said first rim being of greater diameter than said second rim, said annular ring on said disc and said first annular rim on said plate being slidably engaged whereby said exhaust port valve is supported adjacent said exhaust port by said movable diaphragm, an exhaust port valve spring normally in compression between said disc and said valve plate whereby said exhaust port valve is spring biased toward the exhaust side of said exhaust port against fluid pressure in said exhaust port;

a safety vent comprising an opening passing through said plate from the seal side to the outer side thereof inside the circular area defined by said second annular rim, a safety vent valve seat adjacent the outer side of said opening;

a safety vent valve positioned adjacent the outer side of said opening and in closing relationship therewith, said vent valve having a vent seal side adapted to cooperate in sealing relationship with said vent valve seat and an outer side exposed to ambient fluid pressure; and a safety vent valve spring normally in compression between said safety vent valve and said second annular rim whereby said vent valve is spring biased toward the outer side of said opening against fluid pressure on the seal side of said vent valve.

7. A pressure compensated exhalation valve in a pressure compensated breathing fluid supply system which comprises:

a valve body having;

an exhaust port;

a compensating pressure chamber having a pressure inlet orifice in one wall thereof;

a movable diaphragm the inner surface of which forms one wall of said pressure chamber, the outer surface of said diaphragm being exposed to ambient pressure, said diaphragm normally being biased outwardly from said pressure chamber;

an exhaust port valve movable with said diaphragm, and positioned adjacent said exhaust port in closing relationship therewith, said exhaust port valve normally being biased toward said exhaust port; and safety relief means comprising a safety vent in said exhaust port valve, said vent being open to ambient pressure, and a safety vent valve positioned adjacent said vent and adapted to close said vent, said vent valve normally being biased to close said vent.

8. A pressure compensated exhalation valve in a pressure compensated breathing fluid supply system which comprises:

a valve body having;

an exhaust port;

a compensating pressure chamber having a pressure inlet orifice in one wall thereof;

a movable diaphragm the inner surface of which forms one wall of said pressure chamber, the outer surface of said diaphragm being exposed to ambient pressure, said diaphragm normally being biased outwardly from said pressure chamber;

an exhaust port valve movable with said diaphragm, and positioned adjacent said exhaust port in closing relationship therewith, said exhaust port valve normally being biased toward said exhaust port; and safety relief means adapted to dump excessive pressure in said compensating pressure chamber comprising a relief port in said diaphragm, said relief port being open to ambient pressure, and a poppet valve positioned adjacent said relief port and adapted to close said relief port, said poppet valve normally being biased to close said relief port.

9. A pressure compensated exhalation valve with safety relief means which comprises:

a valve body having;

an exhaust port with a valve seat adjacent the exhaust side thereof;

a compensating pressure chamber having a fluid pressure inlet orifice in a wall thereof, and a relief port in a wall thereof, said relief port having a cross-sectional area greater than the cross-sectional area of said pressure inlet orifice, said relief port being open to ambient fluid pressure;

a poppet valve positioned adjacent said relief port outside of said chamber, said poppet valve being spring biased to close said relief port against fluid pressure in said chamber, said poppet valve being openable by an excess of compensating pressure in said compensating pressure chamber;

a movable diaphragm the inner surface of which forms a wall of said chamber, the outer surface of said diaphragm being exposed to ambient fluid pressure, said diaphragm being spring biased outwardly from said chamber and being adapted to be pressure biased outwardly from said chamber by compensating fluid pressure in said chamber, said diaphragm comprising a rigid disc having an annular ring extending outwardly from about the periphery of the outer surface of said disc and a flexible seal extending between said valve body and said disc;

an exhaust port valve positioned adjacent the exhaust side of said exhaust port in closing relationship therewith, said exhaust port valve comprising a rigid valve plate having a seal side adapted to cooperate in sealing relationship with said valve seat and an outer side exposed to ambient fluid pressure, an annular rim extending outwardly from the outer side of said valve plate, said annular ring on said disc and said annular rim on said plate being slidably engaged whereby said exhaust port valve is supported adjacent said exhaust port by said movable diaphragm; and an exhaust port valve spring normally in compression between said disc and said valve plate whereby said exhaust port valve is spring biased toward the exhaust side of said exhaust port against fluid pressure on said seal side.

References Cited

UNITED STATES PATENTS

| 2,828,740 | 4/1958 | Kindred. | |
| 3,099,987 | 8/1963 | Bartlett | 137—102 XR |
| 3,342,200 | 9/1967 | Wilcox | 137—102 |

WILLIAM F. O'DEA, Primary Examiner

WILLIAM H. WRIGHT, Assistant Examiner

U.S. Cl. X.R.

128—146; 137—512, 596, 614